(12) United States Patent  
Yang et al.

(10) Patent No.: US 7,755,240 B2
(45) Date of Patent: Jul. 13, 2010

(54) FAN MOTOR WITH MOUNTING STRUCTURE

(75) Inventors: Zhi-Ya Yang, Shenzhen (CN); Ying-Min Huang, Taipei Hsien (TW); Wen-Gao Wang, Shenzhen (CN)

(73) Assignees: Fu Zhuri Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 287 days.

(21) Appl. No.: 11/961,313

(22) Filed: Dec. 20, 2007

(65) Prior Publication Data

US 2009/0096304 A1 Apr. 16, 2009

(30) Foreign Application Priority Data

Oct. 12, 2007 (CN) .......................... 2007 1 0123921

(51) Int. Cl.
*H02K 5/04* (2006.01)
*H02K 11/00* (2006.01)
(52) U.S. Cl. .................. 310/91; 310/67 R; 310/DIG. 6; 411/45

(58) Field of Classification Search .................... 310/91
See application file for complete search history.

(56) References Cited

U.S. PATENT DOCUMENTS

| 4,502,193 | A | * | 3/1985 | Harmon et al. ................ 24/621 |
| 5,223,674 | A | * | 6/1993 | Reznikov ................ 174/138 D |
| 5,285,353 | A | * | 2/1994 | Buck et al. .................. 361/732 |
| 5,754,412 | A | * | 5/1998 | Clavin ........................ 361/804 |
| 7,224,092 | B2 | * | 5/2007 | Masuda et al. ............ 310/67 R |
| 2002/0063494 | A1 | * | 5/2002 | Yoshikawa et al. .......... 310/261 |

* cited by examiner

*Primary Examiner*—Burton Mullins
(74) *Attorney, Agent, or Firm*—Jeffrey T. Knapp (57) ABSTRACT

A fan motor includes a frame (10) and a motor (30). The frame includes a supporting plate (13) and a central tube (16). A pair of arms (181) extends upwardly from the supporting plate and spaces from each other to form a gap (184) therebetween. Each arm has a barb (182) at a top end thereof. The motor includes a circuit board (31) and a stator (33). The stator defines an axial hole (338) for receiving the central tube therein. The circuit board defines a fixing hole (312) therein corresponding to the pair of arms. The pair of arms extend through the fixing hole with the barbs of the pair of arms abutting on the circuit board. A pin (191) is inserted into the gap between the pair of the arms.

13 Claims, 6 Drawing Sheets

FAN MOTOR WITH MOUNTING STRUCTURE

BACKGROUND

1. Technical Field

The present invention relates generally to a mounting structure, and more particularly to a mounting structure for a fan motor.

2. Description of Related Art

An electrical fan usually includes a frame, a bearing support formed at a middle of the frame, a stator disposed around the bearing support, and a rotor rotatably mounted surrounding the stator. The bearing support is for receiving a bearing therein. The bearing rotatably supports a rotor shaft which is connected to the rotor. The bearing support is usually made of plastic, and includes a central tube for fixedly positioning the stator.

In order to fixedly position the stator to the central tube, an outer surface of the central tube often interferentially engages with an inner surface of the stator. However, heat is generated rapidly when the electrical fan works. The unwanted heat will accumulate in the fan. Typically, the central tube is integrally formed with the frame of the fan by plastic injecting molding technique, and therefore is sensitive to high temperature. Excessive high temperature will cause the central tube to deform, which results in unstable engagement between the stator and the central tube. Even worse, the stator may fall off from the central tube if the central tube deforms seriously.

As an alternative method, adhesive is often spread between an outer surface of the central tube and an inner surface of the stator so that the stator is fixed to the central tube via the adhesive. This complicates the assembly of the electrical fan and thus increases the cost of the electrical fan. Furthermore, the adhesive is made of environmentally unfriendly material which may cause pollution.

SUMMARY

The present invention relates to a mounting structure for a fan motor. According to a preferred embodiment of the present invention, the fan motor includes a frame and a motor. The frame includes a supporting plate and a central tube. A pair of arms extends upwardly from the supporting plate and spaces from each other to form a gap therebetween. Each arm has a barb at a top end thereof. The motor includes a circuit board and a stator. The stator defines an axial hole for receiving the central tube therein. The circuit board defines a fixing hole therein corresponding to the pair of arms. The pair of arms extend through the fixing hole with the barbs of the pair of arms abutting on the circuit board. A pin is inserted into the gap between the pair of the arms.

Other advantages and novel features of the present invention will become more apparent from the following detailed description of preferred embodiment when taken in conjunction with the accompanying drawings, in which:

DETAILED DESCRIPTION

Figure 1:
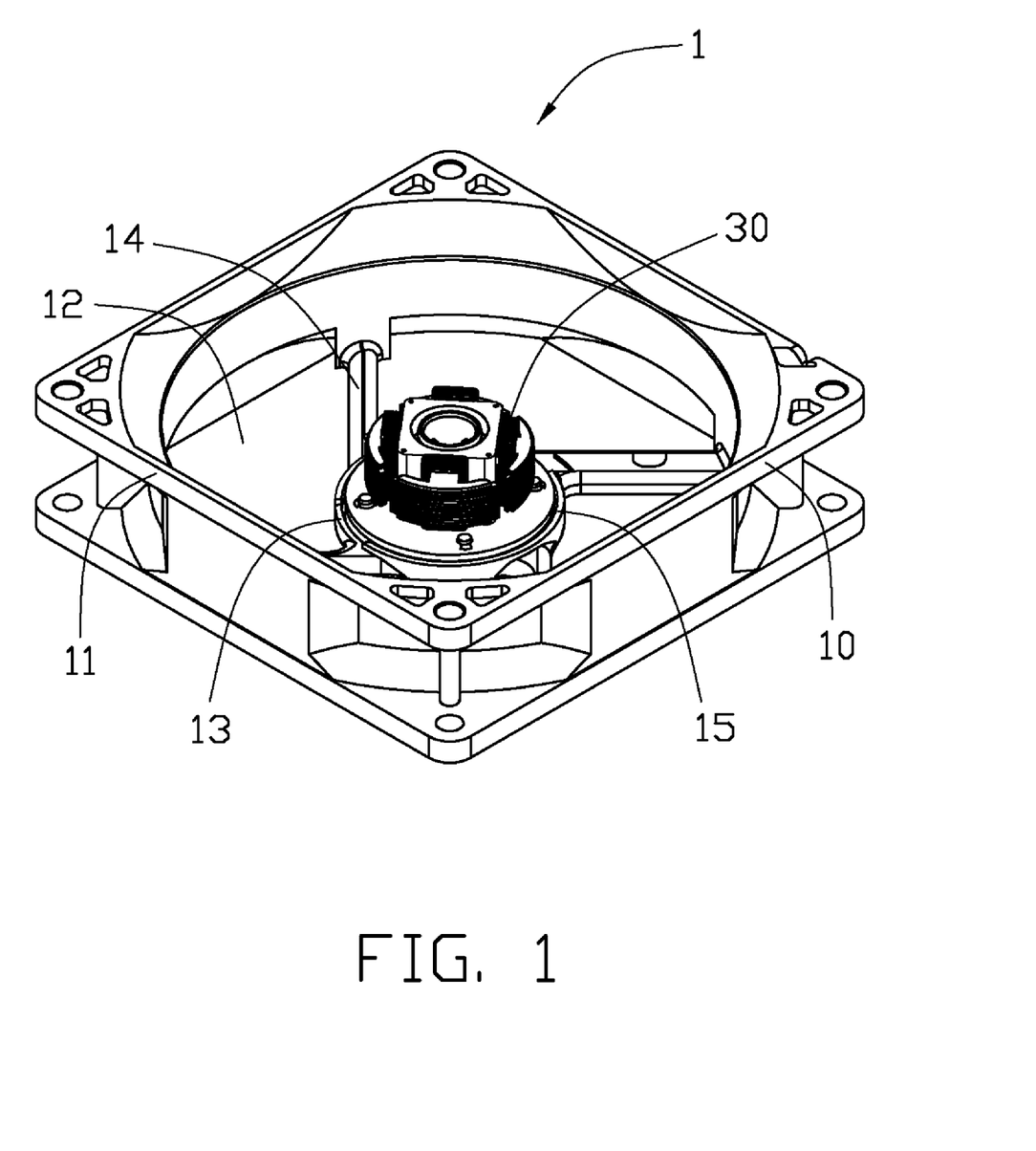
FIG. 1 is an isometric view of a fan motor containing a mounting structure according to a preferred embodiment of the present invention.

A mounting structure according to a preferred embodiment of the present invention is particularly designed for being used in fan motors. Referring to FIG. 1, a fan motor 1 containing the mounting structure is shown. The fan motor 1 includes a frame 10 and a motor 30 mounted to the frame 10. The mounting structure is used for mounting the motor 30 onto the frame 10 of the fan motor 1.

Figure 2:
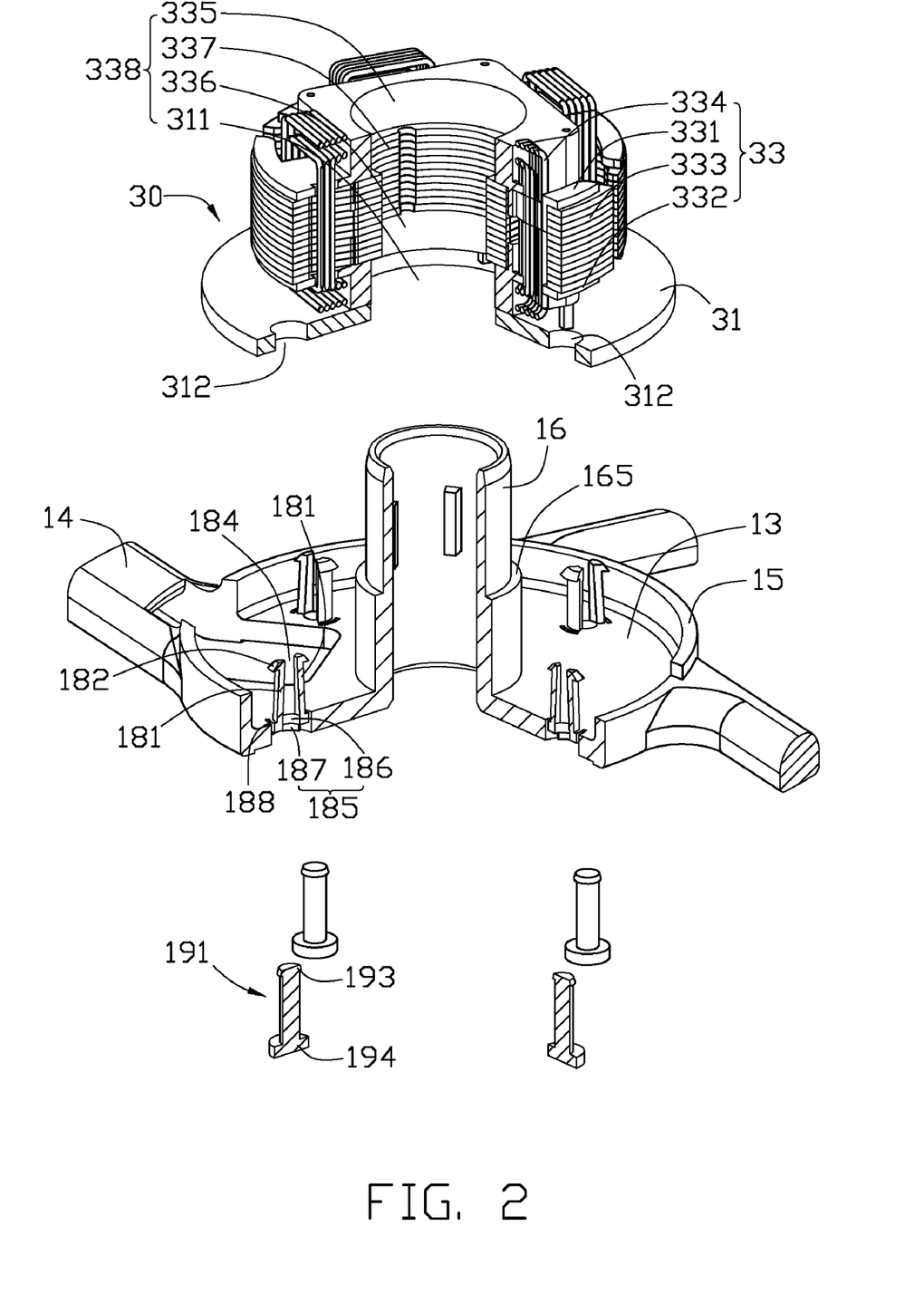
FIG. 2 is an exploded, isometric view of the fan motor of FIG. 1.

Referring to FIG. 2, the motor 30 includes a printed circuit board 31, a stator 33 electrically connected with the printed circuit board 31 and a rotor (not shown) rotatably disposed around the stator 33. The printed circuit board 31 is annular shaped in profile and defines a central hole 311 therein. The printed circuit board 31 further defines four circular shaped fixing holes 312 therein. The fixing holes 312 are evenly spaced apart from each other and are disposed around the central hole 311 of the printed circuit board 31.

The stator 33 is fixed to the printed circuit board 31 and includes a top insulator 331, a bottom insulator 332, a yoke assembly 333 sandwiched between the top and bottom insulators 331, 332 and a coil 334 disposed around teeth (not labeled) of the yoke assembly 333. The coil 334 electrically connects with the printed circuit board 31. The top and bottom insulators 331, 332 and the yoke assembly 333 respectively define central holes 335, 336, 337 therein. The central holes 335, 336, 337 of the top and bottom insulators 331, 332 and the yoke assembly 333 are coaxial with the central hole 311 of the printed circuit board 31 so as to cooperatively form an axial hole 338 for the stator 33. A diameter of the central hole 337 of the yoke assembly 333 is smaller than that of the central holes 335, 336, 311 of the top and bottom insulators 331, 332 and the printed circuit board 31. An inner surface of the yoke assembly 333 extends inwardly beyond inner surfaces of the top and bottom insulators 331, 332.

The frame 10 of the fan motor 1 includes a rectangular shaped main body 11. The main body 11 of the frame 10 defines an accommodating space 12 for receiving the stator 33 and the rotor therein. The frame 10 of the fan motor 1 further includes a circular shaped supporting plate 13 at a bottom of the main body 11, and a plurality of ribs 14 integrally connecting the supporting plate 13 with the bottom of the main body 11. The supporting plate 13 has an annular shaped flange 15 which extends upwardly from an outer periphery of the supporting plate 13.

A central tube 16 is integrally formed with the supporting plate 13 and the frame 10 to form a single piece and extends upwardly from a middle portion of the supporting plate 13 into the accommodating space 12. The central tube 16 is a hollow cylinder. A diameter of the outer wall of the central tube 16 is slightly smaller than a diameter of the central hole 337 of the yoke assembly 333. The central tube 16 extends through the central holes 311, 336, 337, 335 of the printed circuit board 31, of the bottom insulator 332, of the yoke assembly 333, and of the top insulator 331 in that order. The central tube 16 integrally and axially extends an annular protrusion 165 from the outer wall of the central tube 16 at a bottom end thereof.

In the present fan motor 1, the mounting structure includes four mounting units 18 (shown in FIG. 5) axially and upwardly extending from the supporting plate 13 from positions respectively corresponding to the fixing holes 312 of the printed circuit board 31. Each mounting unit 18 includes a pair of arms 181 and a pin 191 received between the pair of arms 181.

Each arm 181 is made of resilient materials such as plastic and integrally formed with the supporting plate 13 as a single piece by a plastic injecting molding technique. Each arm 181 has a barb 182 outwardly extending from a top end of the arm 181. The pair of arms 181 stand opposite and are spaced from each other so as to form a gap 184 therebetween. Each arm 181 is stick-shaped and slantways extends toward the other one of the pair of arms 181 so that a width of a top end of the gap 184 is smaller than a width of a bottom end of the gap 184. The width of the gap 184 is gradually decreased from the bottom end towards the top end of the gap 184. A through aperture 185 is defined in the supporting plate 13 at a position between each pair of arms 181. The through aperture 185 is circular shaped in profile and communicates with the gap 184. The through aperture 185 has a top through hole 186 at a top thereof and a bottom through hole 187 at a bottom thereof. A diameter of the top through hole 186 is smaller than a diameter of the bottom through hole 187. A slot 188 is defined in the supporting plate 13 at a position adjacent to an outer bottom edge of each arm 181 and communicates with the bottom through hole 187 of the through aperture 185 so as to increase the resilience of the arms 181 of the mounting units 18.

The pin 191 is extended through the through aperture 185 and is received in the gap 184 between the pair of arms 181. The pin 191 has a cylindric shape. A diameter of the pin 191 is greater than the width of the top end of the gap 184. Alternatively, the pin 191 may be rectangular shaped, or prism-shaped in profile, and the through aperture 185 and the gap 184 may have a similar configuration to the pin 191 so that the pin 191 can extend through therefrom. The pin 191 has a top cap 193 at a top end thereof and a bottom cap 194 at a bottom end thereof. A diameter of the bottom cap 194 is slightly smaller than a diameter of the bottom through hole 187 of the through aperture 185, and a height of the bottom cap 194 is equal to a height of the bottom through hole 187. The top cap 193 is made of resilient materials selected from plastic and rubber. A diameter of the top cap 193 is slightly greater than a diameter of a middle portion of the pin 191.

Figure 3:
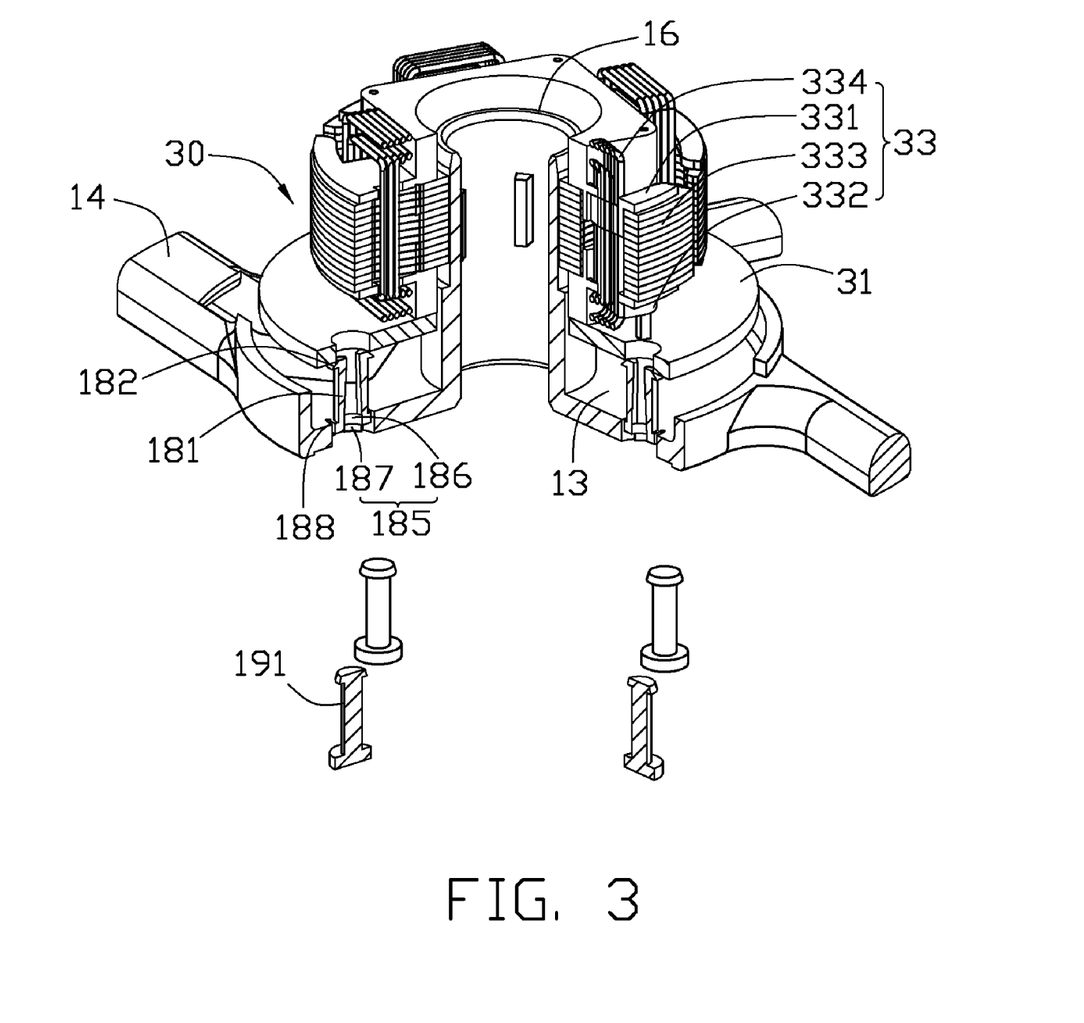
FIGS. 3-6 are isometric views of the fan motor of FIG. 1, showing different stages in assembling the fan motor.

Referring also to FIG. 3, in pre-assembly of the fan motor 1, the stator 33 is loosely disposed around the central tube 16 of the frame 10, with a part of the central tube 16 extending through the axial hole 338 of the motor 30. Meanwhile, each fixing hole 312 of the printed board 31 is aligned with the corresponding pair of arms 181 of the mounting unit 18.

Figure 4:
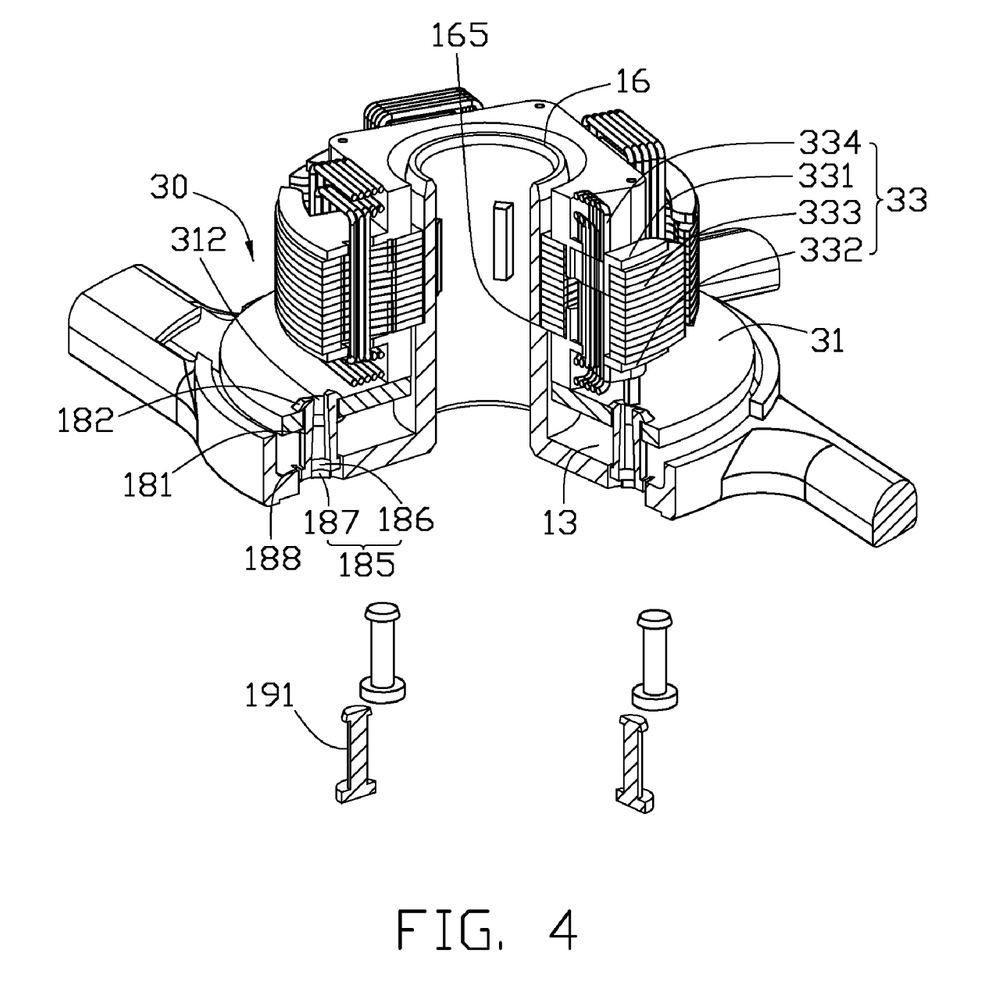

Referring also to FIG. 4, the stator 33 is pressed downwardly until the pair of arms 181 of the mounting unit 18 extends through the corresponding fixing hole 312 of the printed circuit board 31. Meanwhile, the central tube 16 extends through the axial hole 338 of the stator 33, and a bottom surface of the yoke assembly 333 abuts against a top surface of the protrusion 165. During assembly of the fan motor 1, each pair of arms 181 of the mounting unit 18 firstly is elastically deformed and closes with each other, and then returns to its original position with bottom surfaces of the barbs 182 of each pair of arms 181 abutting against a top surface of the printed circuit board 31.

Figure 5:
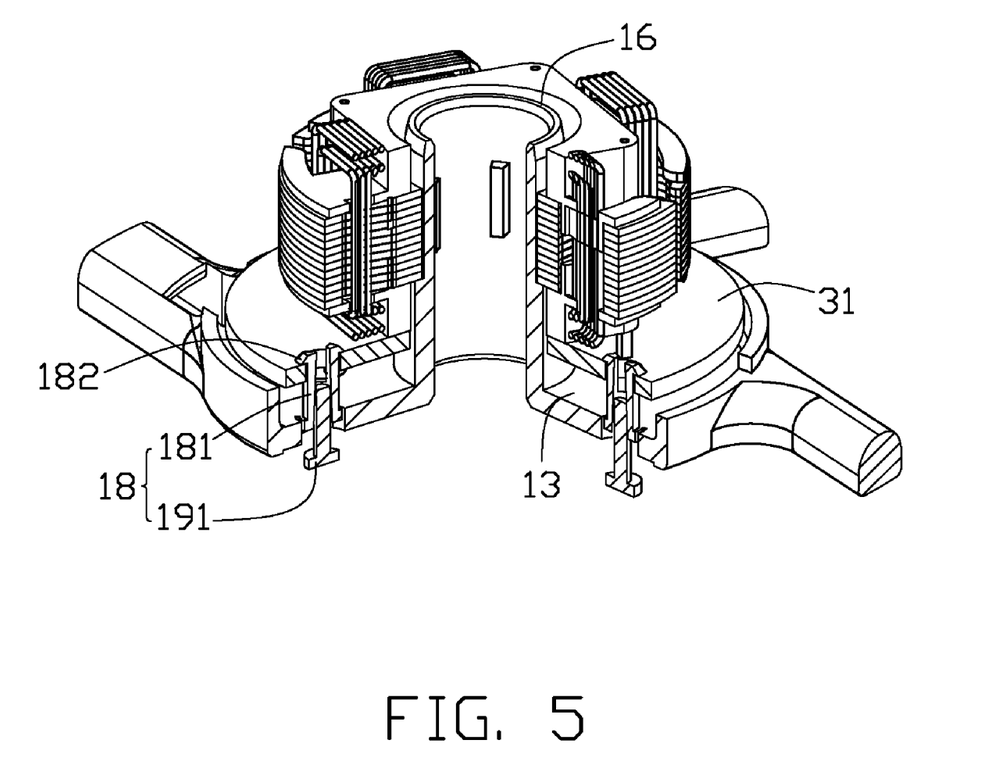

Referring also to FIG. 5, each pin 191 is pressed upwardly, with the pin 191 extending through the bottom through hole 187 of the corresponding through aperture 185. The pin 191 is continuously pushed to move upwardly and force its top cap 193 to extend through the top through hole 186 of the corresponding through aperture 185 and then insert into the gap 184 between the corresponding pair of arms 181. The top cap 193 of the pin 191 is elastically deformed by an extrusion of inner surfaces of the pair of arms 181. Meanwhile, the pair of arms 181 is elastically deformed and the arms 181 splay along directions apart from each other due to the insertion of the pin 191.

Figure 6:
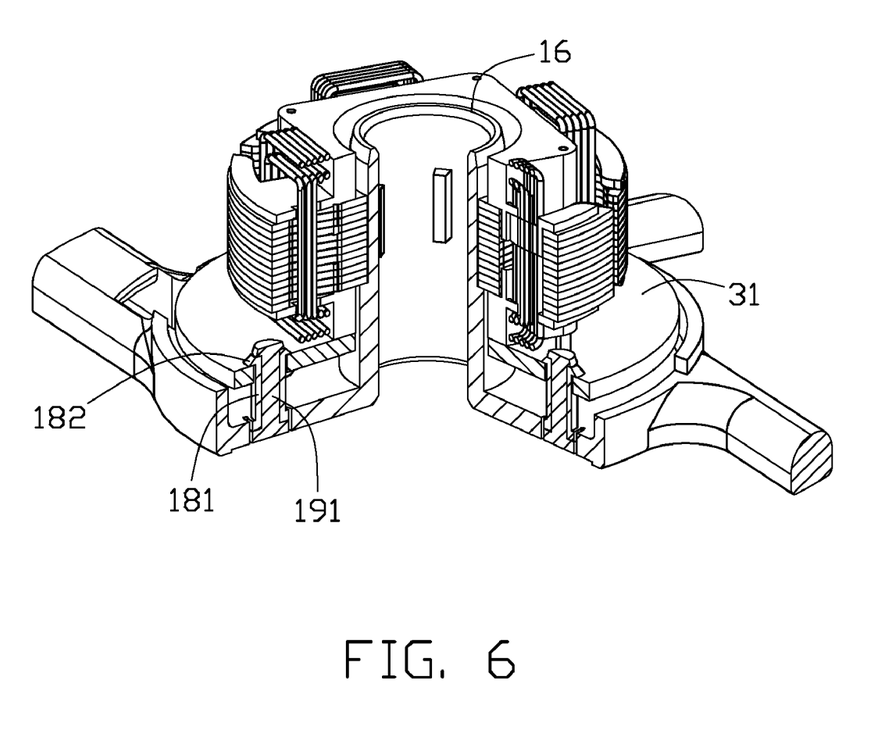

Referring also to FIG. 6, the pin 191 is continuously pressed upwardly until the top cap 193 of the pin 191 extends through the gap 184 between the pair of arms 181, with the bottom cap 194 of the pin 191 received in the bottom through hole 187 of the through aperture 185, a top surface of the bottom cap 194 abutting against a bottom surface of the supporting plate 13 and a bottom surface of the top cap 193 of the pin 191 abutting against a top surface of the barbs 182 of each pair of arms 181, to thereby securely mount the stator 33 to the central tube 16 and the supporting plate 13 of the frame 10.

In the assembly of the present mounting structure, the barbs 182 of each pair of arms 181 abut against a top surface of the printed circuit board 31 of the stator 33. Simultaneously, the pin 191 is inserted into the gap 184 between the corresponding pair of arms 181 to prevent the pair of arms 181 from falling off from the printed circuit board 31. Therefore, the stator 33 is securely mounted to the central tube 16 and the supporting plate 13 of the frame 10. There is no need to spread adhesive between the outer wall of the central tube 16 and the inner surface of the yoke assembly 333. This decreases the cost of the fan motor 1 and satisfies the need to protect the environment. Furthermore, the stator 33 is assembled to the central tube 16 merely via pressing operations of the stator 33 and the pin 191. This simplifies the assembly of the mounting structure and further decreases the cost of the fan motor 1. Moreover, the mounting units 18 are formed on the supporting plate 13, whereby heat generated between the stator 33 and the central tube 16 when the fan motor 1 works does not effect the fixation of the stator 33.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan motor comprising:
   a frame comprising a supporting plate and a central tube extending upwardly from the supporting plate;
   a pair of arms extending upwardly from the supporting plate and spacing from each other to form a gap therebetween, each arm comprising a barb at a top end thereof;
   a pin connected with the pair of arms; and
   a motor comprising a circuit board and a stator electrically connected with the circuit board, the stator defining an axial hole receiving the central tube therein, the circuit board defining a fixing hole therein corresponding to the pair of arms;
   wherein the pair of arms extend through the fixing hole, the barbs of the pair of arms abut against a top surface of the printed circuit board of the motor, and the pin is inserted into the gap between the pair of arms; and
   wherein a through aperture is defined in the supporting plate at a position between the pair of arms, the through aperture communicating with the gap, the pin comprising a bottom cap received in the through aperture.

2. The fan motor as described in claim 1, wherein a width of a top end of the gap is smaller than a width of a bottom end of the gap.

3. The fan motor as described in claim 1, wherein the pin further comprises a top cap at a top end thereof, a diameter of the top cap being slightly greater than a diameter of a middle portion of the pin, a bottom surface of the top cap abutting against top surfaces of the barbs of the pair of arms.

4. The fan motor as described in claim 1, wherein a slot is defined in the supporting plate at a position adjacent to each arm, and the slot communicates with the through aperture.

5. The fan motor as described in claim 1, wherein the through aperture comprises a top through hole at a top thereof and a bottom through hole at a bottom thereof, a diameter of the top through hole being smaller than a diameter of the bottom through hole, the bottom cap of the pin being received in the bottom through hole.

6. A fan motor comprising:
 a frame comprising a supporting plate and a central tube extending upwardly from the supporting plate;
 a pair of arms extending upwardly from the supporting plate and spacing from each other to form a gap therebetween, each arm comprising a barb at a top end thereof;
 a pin connected with the pair of arms; and
 a motor comprising a circuit board and a stator electrically connected with the circuit board, the stator defining an axial hole receiving the central tube therein, the circuit board defining a fixing hole therein corresponding to the pair of arms;
 wherein the pair of arms extend through the fixing hole, the barbs of the pair of arms abut against a top surface of the printed circuit board of the motor, and the pin is inserted into the gap between the pair of arms;
 wherein the pin comprises a top cap at a top end thereof, a diameter of the top cap being slightly greater than a diameter of a middle portion of the pin, a bottom surface of the top cap abutting against top surfaces of the barbs of the pair of arms;
 wherein the top cap is made of a resilient material selected from a group consisting of plastic and rubber; and
 wherein a through aperture is defined in the supporting plate at a position between the pair of arms, the through aperture communicating with the gap, the pin comprising a bottom cap received in the through aperture.

7. The fan motor as described in claim 6, wherein a width of a top end of the gap is smaller than a width of a bottom end of the gap.

8. The fan motor as described in claim 6, wherein a slot is defined in the supporting plate at a position adjacent to each arm, and the slot communicates with the through aperture.

9. The fan motor as described in claim 6, wherein the through aperture comprises a top through hole at a top thereof and a bottom through hole at a bottom thereof, a diameter of the top through hole being smaller than a diameter of the bottom through hole, the bottom cap of the pin being received in the bottom through hole.

10. A fan motor comprising:
 a frame;
 a supporting plate located in the frame, a central tube extending upwardly from the supporting plate;
 a plurality of ribs connecting the supporting plate with the frame;
 a stator mounted to the central tube, the stator comprising a circuit board, the circuit board defining a hole therein;
 a pair of arms extending upwardly from the supporting plate and spacing from each other to form a gap therebetween, each arm comprising a barb at a top end thereof; and
 a pin inserted into the gap, the pin comprising a top cap and a bottom cap at opposite ends thereof, the circuit board and the supporting plate being sandwiched between the top and bottom caps;
 wherein when the pin is inserted into the gap, the top cap expands the pair of arms outwardly, and when the top cap passes through the gap, the top cap abuts on the barbs of the pair of arms; and
 wherein a top surface of the bottom cap abuts against a bottom surface of the supporting plate.

11. The fan motor as described in claim 10, wherein a width of a top end of the gap is smaller than a width of a bottom end of the gap.

12. The fan motor as described in claim 10, wherein a diameter of the top cap is slightly greater than a diameter of a middle portion of the pin, a bottom surface of the top cap abutting on a top surface of each of the barbs of the pair of arms.

13. The fan motor as described in claim 12, wherein the top cap is made of a resilient material selected from a group consisting of plastic and rubber.

* * * * *

UNITED STATES PATENT AND TRADEMARK OFFICE
CERTIFICATE OF CORRECTION

PATENT NO. : 7,755,240 B2  Page 1 of 1
APPLICATION NO. : 11/961313
DATED : July 13, 2010
INVENTOR(S) : Zhi-Ya Yang, Ying-Min Huang and Wen-Gao Wang

It is certified that error appears in the above-identified patent and that said Letters Patent is hereby corrected as shown below:

Please replace Section (73) regarding "Assignees" on the front page of the Patent with the following:

(73) Assignees: Fu Zhun Precision Industry (ShenZhen) Co., Ltd., Shenzhen, Guangdong Province (CN); Foxconn Technology Co., Ltd., Tu-Cheng, Taipei Hsien (TW).

Signed and Sealed this

Fourteenth Day of September, 2010

David J. Kappos
*Director of the United States Patent and Trademark Office*